(12) United States Patent
Konanur et al.

(10) Patent No.: US 9,848,281 B2
(45) Date of Patent: Dec. 19, 2017

(54) ENHANCING DATA RATE OR RANGE OF NEAR FIELD COMMUNICATION USING DIFFERENTIAL COIL TOPOLOGY

(71) Applicant: Intel Corporation, Santa Clara, CA (US)

(72) Inventors: Anand S. Konanur, Sunnyvale, CA (US); Niranjan Karandikar, Campbell, CA (US); Songnan Yang, San Jose, CA (US); Ulun Karacaoglu, San Diego, CA (US); Edward Agis, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/572,050

(22) Filed: Dec. 16, 2014

(65) Prior Publication Data

US 2016/0174017 A1   Jun. 16, 2016

(51) Int. Cl.
*H04B 5/00* (2006.01)
*H04W 4/00* (2009.01)
*H01Q 7/00* (2006.01)

(52) U.S. Cl.
CPC ............. *H04W 4/008* (2013.01); *H01Q 7/00* (2013.01); *H04B 5/0031* (2013.01); *H04B 5/0081* (2013.01); *H04B 5/0037* (2013.01)

(58) Field of Classification Search
CPC .. C07K 14/47; C07K 7/08; G01N 2333/5406; G01N 33/6872
USPC ................................................. 455/41.1, 41.2
See application file for complete search history.

(56) References Cited

U.S. PATENT DOCUMENTS

| | | | | |
|---|---|---|---|---|
| 6,744,883 B1* | 6/2004 | Bingel | ................... | H04M 1/74 379/106.09 |
| 2007/0139261 A1* | 6/2007 | Vacanti | ..................... | G01S 7/35 342/174 |
| 2011/0248825 A1* | 10/2011 | Hamel | ..................... | H04Q 9/00 340/10.1 |
| 2013/0134793 A1* | 5/2013 | Ryu | ....................... | H02J 17/00 307/104 |
| 2014/0045442 A1* | 2/2014 | Caruana | .............. | H01Q 1/2275 455/78 |
| 2014/0086347 A1* | 3/2014 | Kang | ................... | H04B 5/0031 375/259 |
| 2014/0162554 A1* | 6/2014 | Sankar | ................. | H04B 5/0031 455/41.2 |
| 2014/0228672 A1* | 8/2014 | Duensing | ............ | G01R 33/365 600/410 |

* cited by examiner

*Primary Examiner* — Xin Jia
(74) *Attorney, Agent, or Firm* — Schiff Hardin LLP

(57) ABSTRACT

Described herein are architectures, platforms and methods for enhancing range and increasing data rates during near field communication (NFC) related functions or transactions.

20 Claims, 4 Drawing Sheets

_US 9,848,281 B2_

ENHANCING DATA RATE OR RANGE OF NEAR FIELD COMMUNICATION USING DIFFERENTIAL COIL TOPOLOGY

BACKGROUND

A typical wireless communication and power transfer schemes in use today employ inductive coupling between a resonant first coil antenna and a resonant second coil antenna. For example, the wireless communication includes near field communications (NFC) related functions or Europay, MasterCard and Visa (EMVCO) based contactless payment and wireless charging.

In devices that use NFC for data transfer, there is a mode of operation where a power for the operation of a passive tag is derived from a reader, in addition to the communication link. This mode of operation uses a strong carrier signal to power a tag and simultaneously tries to listen to a load modulated signal from the tag. In this regard, there may be a 50 to 60 dB difference in magnitude of the strong carrier signal and the faint load modulated signal that must be handled by a receiver of the device.

The above described setup places a lot of design stress on a dynamic range required for an analog to digital converter (ADC). Currently, a high dynamic range such as a 12-bit ADC handles this design stress. However, the 12-bit ADC may only be sampled at a lower rate than a lower resolution ADC.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for increasing data rates and to enhance range during NFC related functions or transactions.

In an implementation, a first coil antenna and a second coil antenna of a portable device are connected in series and are further disposed within the portable device to avoid presence of linkages between the two. In this implementation, the receiving of a modulated signal through the first coil antenna is not affected by a carrier signal or an operating frequency that is present at the second coil antenna, or vice versa.

With the received modulated data (e.g., through the first coil antenna), an NFC module may be configured to subtract the carrier signal at the second coil antenna from the received modulated data. The subtraction eliminates the carrier signal in the received modulated data and as such, a low-frequency modulating data is produced as a result.

Figure 1:
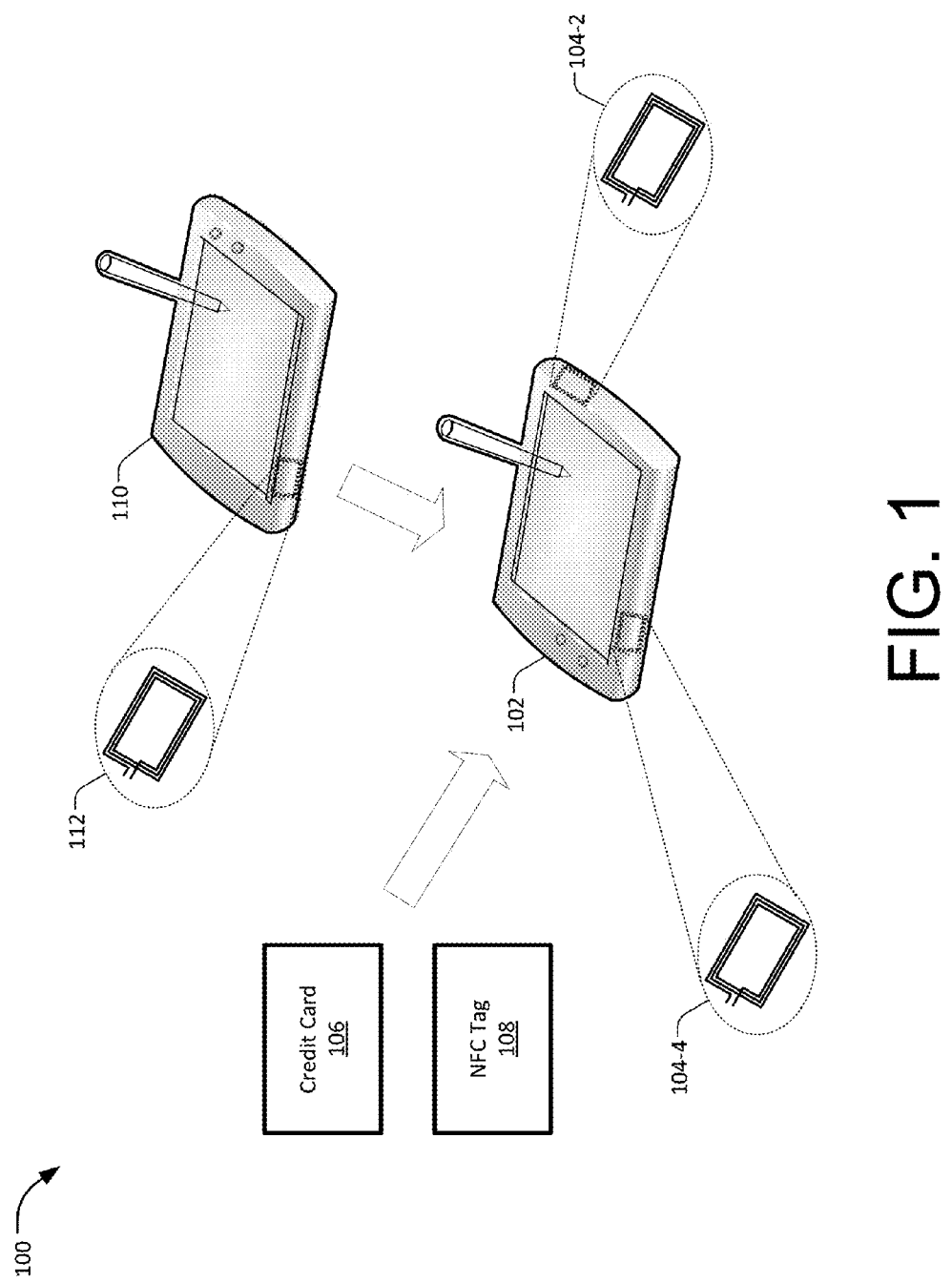
FIG. 1 is an example scenario illustrating a near field communication (NFC) coupling arrangement to implement enhanced range and increased data rates during NFC related functions or transactions.

In an implementation, the low-frequency modulating data is fed to an analog to digital converter (ADC) to transform the modulating data from an analog to a digital signal. In this implementation, the ADC may not require a higher resolution feature as the carrier signal is already cancelled prior to the ADC processing. In other words, the dynamic range requirements at the receiver side of the portable device may be substantially reduced by using, for example, a lower resolution ADC FIG. 1 is an example scenario 100 that illustrates an NFC coupling arrangement as described in implementations herein. For example, the NFC coupling arrangement demonstrates a particular implementation for obtaining higher data rates and an increase in range during NFC related functions or transactions between devices.

Scenario 100 may include a portable device 102 with a first coil antenna 104-2 and a second coil antenna 104-4. The scenario 100 further shows a portable device 102 in near field coupling arrangement with a credit card 106 (e.g., payment transactions) or an NFC tag 108 (e.g., tag reading). Furthermore, a portable device 110 with an antenna 112 is shown to engage in near field coupling arrangement with the portable device 102 (e.g., NFC communications).

As an example of present implementations herein, the portable device 102 is utilized for payment transactions (e.g., EMVco transactions) for the credit card 106. In this example, the portable device 102 establishes near field coupling by aligning either the first coil antenna 104-2 or the second coil antenna 104-4 in the direction and within a certain distance of the credit card 106. At this certain distance, mutual induction between credit card strips (not shown) and the first or second coil antenna may facilitate data communications between the credit card 106 and the portable device 102.

Similarly, the NFC tag 108 and the portable device 110 may establish near field coupling arrangement with the portable device 102 in the same manner described above. Particularly, coil strips (not shown) of the NFC tag 108 or the antenna 112 of the portable device 110 may be positioned at a certain distance to either the first or second coil antenna of the portable device 102 to engage in NFC communications.

In an implementation, the first coil antenna 104-2 and the second coil antenna 104-2 of the portable device 102 may be connected in series and are disposed in a manner to avoid presence of flux linkages between the two. For example, the first coil antenna 104-2 may be disposed on a display side and faces a user (not shown) while the second coil antenna 104-4 may be disposed at a corner or a back-side of the portable device 102. Other examples such as when the first and second coil antennas are at opposite corners of the portable device 102 may similarly apply as long as there is no flux linkages between the two.

With the setup described above, the NFC related functions or transactions may either be facilitated by the first coil antenna 104-2, or the second coil antenna 104-4. For example, due to the configured physical locations of both coil antennas, directing the credit card 106 to a coverage area of the first coil antenna 104-2 may facilitate the NFC related transaction between the two. In this example, the second coil antenna 104-4, which may be disposed at another end of the portable device 102, may not be a factor to this NFC related transaction. Similarly, the NFC related transaction may be made between the credit card 106 and the second coil antenna 104-4. At this setup, the first coil antenna 104-2 may be a non-factor during the process as described above.

In the implementation described in the foregoing, the NFC related transaction may utilize a modulated signal to transmit data. For example, in the NFC related transaction between the first coil antenna 104-2 and the credit card 106, the first coil antenna 104-2 is configured to have an operating frequency of 13.56 MHz. In this example, the operating frequency of 13.56 MHz is a carrier signal that is modulated by data from the credit card 106 to produce the modulated signal at the first coil antenna 104-2.

In an implementation, an NFC module (not shown) may combine the received modulated signal from the first coil antenna 104-2 with a carrier signal (not shown) that is present in the second coil antenna 104-4, or vice-versa. That is, the NFC module may combine the received modulated signal from the second coil antenna 104-4 with the carrier signal from the first coil antenna 104-2.

Due to this combination of the modulated signal and the carrier signal, the carrier signal is cancelled to provide low-frequency data. In an implementation, the low-frequency data is fed to one receiving pin (not shown) of the NFC module before they are further converted to digital data by an analog to digital converter (ADC) (not shown). In this example, the ADC may not require higher resolution feature as the carrier signal is already cancelled prior to the ADC processing. In other words, the dynamic range requirements at the receiver side may be substantially reduced by using, for example, a lower resolution ADC.

The portable devices 102 and 110 may include, but are not limited to, Ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

Figure 2:
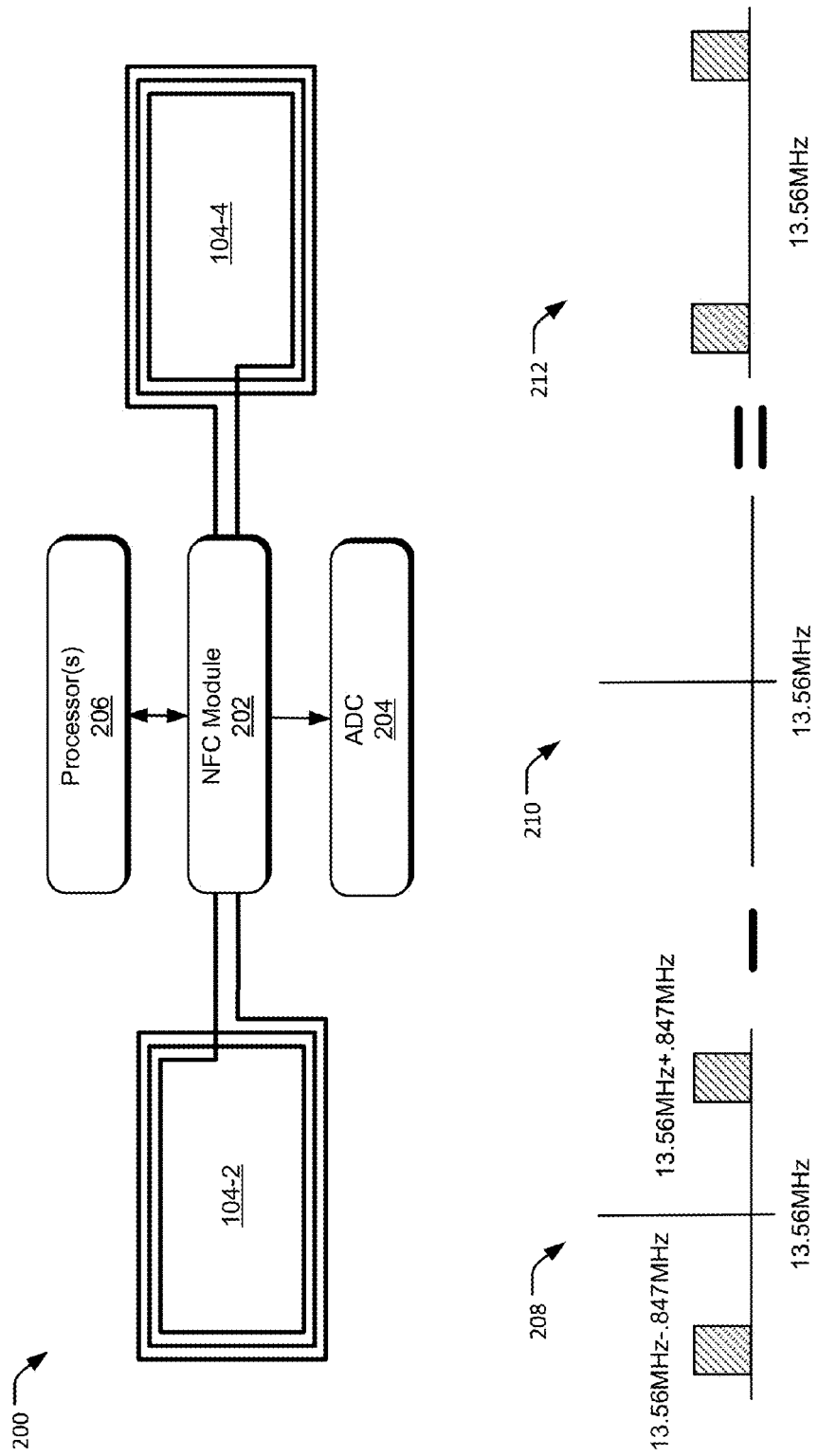
FIG. 2 is an example apparatus that is configured to implement higher data rates and to enhance further the range during near field communication (NFC) related functions or transactions.

FIG. 2 illustrates an example apparatus 200 that is configured to implement higher data rates and to enhance further the range during the near field coupling transactions. The apparatus 200, for example, is integrated to the portable device 102. As shown, the apparatus 200 includes the first and second coil antennas 104-2 and 104-4, an NFC module 202, an ADC 204, and processor(s) 206. Further shown below the apparatus is a graph 208 for the received modulated signal, a graph 210 for a carrier signal, and a graph 212 for the combined signal to obtain the low-frequency modulating data as further discussed below.

During the NFC related function or transaction, for example, between the credit card 106 and the first coil antenna 104-2, the received modulated signal is shown by the graph 208. The received modulated signal at the first coil antenna 104-2 may include an NFC carrier signal of 13.56 MHz, and the sideband signals (i.e., 13.56 MHz+0.847 MHz and 13.56 MHz−0.847 MHz).

As discussed above, the series connected second coil antenna 104-4 is disposed to avoid flux linkages with the first coil antenna 104-2. As such, the second coil antenna 104-4 may provide no effect to the received modulated signal as shown in graph 208. In other words, the second coil antenna 104-4 may carry or include the operating frequency of 13.56 MHz regardless of the present operation or NFC transaction at the first coil antenna 104-2. In this setup, the NFC module 202 may be configured to combine or subtract the carrier signal present in the second coil antenna 104-4 from the received modulated signal in the first coil antenna 104-2. The carrier signal as shown by the graph 210 is not a modulated signal, but a plain carrier frequency of 13.56 MHz for NFC communications.

With the combined signal, the graph 212 is produced. The graph 212, for example, includes the low-frequency modulating data transmitted through the modulated signal. In other words, the combination of the graphs 208 and 210 cancels the carrier signal and such, the low-frequency data signal may be provided at the receiving pin of the NFC module 202 prior to the processing of the low-frequency data signal by the ADC 204.

In an implementation, the ADC 204 may not require high resolution type of ADC. For example, a 4-bit ADC rather than a 12-bit ADC may similarly provide higher data rates and increase in NFC communication range during the NFC related functions or transactions. In this example, the processor(s) may include a software, firmware, hardware, software, or a combination thereof, to control the operation of the apparatus 200.

In other implementations, the first coil antenna or the second coil antenna may be replaced with an equivalent lumped inductor. For example, rather than using a continuous loop of coil antenna in the second coil antenna 104-4, similar results as described above may be obtained if the second coil antenna 104-4 is replaced with a lumped inductor. In this example, a miniaturization of the portable device may be further implemented as well using this design.

With continuing reference to FIG. 2, the NFC module 202 may include a transceiver circuitry that processes electrical signals (not shown) that may be received through the first coil antenna 104-2 or the second coil antenna 104-4. For example, the NFC module 202 may facilitate tuning of the first coil antenna 104-2 for maximum power transfer during transmit or receive operations. In an implementation, the NFC module 202 may be integrated with the first and second coil antennas and/or the processor 206 to form a single module.

Figure 3:
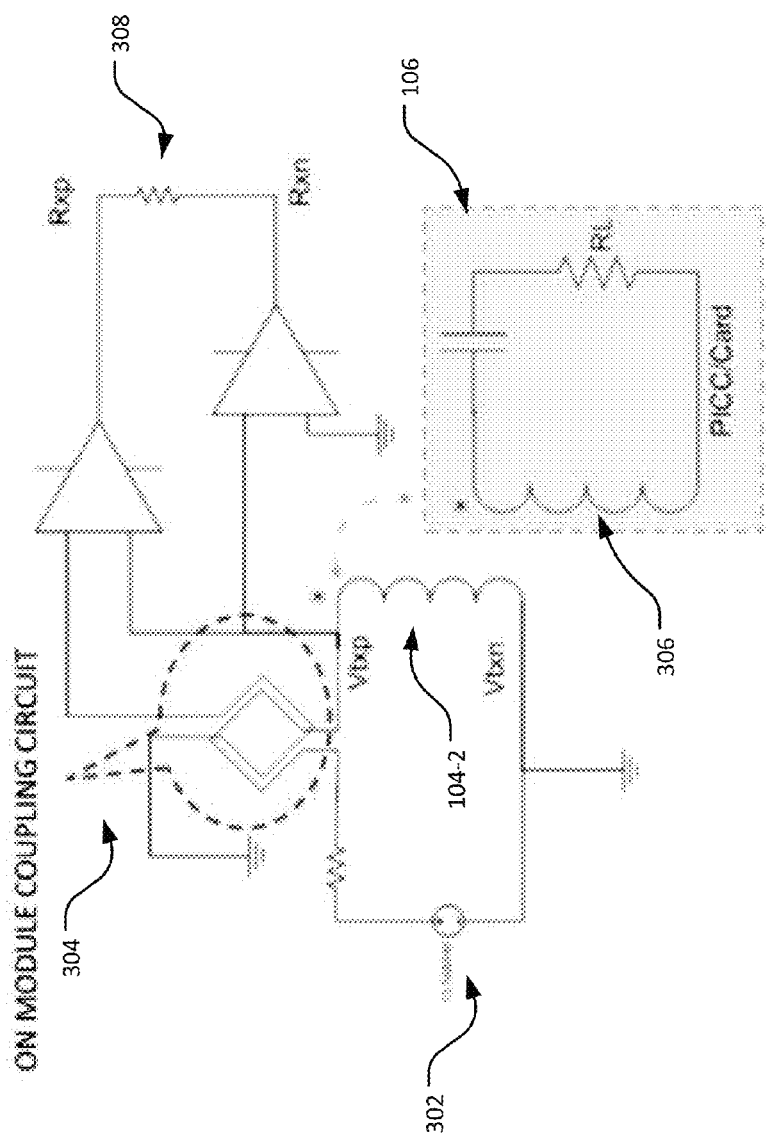
FIG. 3 is an example system that illustrates carrier signal cancellation scheme in a single coil antenna scenario as described in present implementations herein.

FIG. 3 illustrates an example system 300 that illustrates carrier signal cancellation scheme in a single coil antenna scenario.

As shown, the example system 300 shows a carrier signal 302 that supplies a carrier signal across the first coil antenna 104-2 and a coupling circuit 304, which may be a lumped inductor that is connected in series with the first coil antenna 104-2.

When a strip coil 306 of the credit card 106 enters the coverage area of the first coil antenna 104-2, mutual induction may facilitate modulation of the carrier signal across the first coil antenna 104-2. For example, the modulated signal as shown in graph 208 of FIG. 2 may be derived when the strip coil 306 engages in NFC transaction with the first coil antenna 104-2.

For the coupling circuit 304, an undisturbed carrier signal similar to the graph 210 may be derived. For example, the carrier signal 302 supplies an operating frequency of 13.56 MHz for NFC communications. In this example, the 13.56 MHz carrier signal is unperturbed by the present NFC communications between the first coil antenna 104-2 and the credit card 106 because the coupling circuit 304 is disposed in a physical location to avoid flux linkages with the first coil antenna 104-2.

In an implementation, an output 308 may include the graph 212 as shown in FIG. 2. That is, the signal across the first coil antenna 104-2 and the signal across the coupling circuit 304 are combined to eliminate the 13.56 MHz carrier signal. In this implementation, the low-frequency data in the output 308 may then be fed at the receiving pin of the NFC module 202 for further processing such as, by the ADC 204.

In other implementations, additional isolation between the first coil antenna 104-2 and the coupling circuit 304 (or the second coil antenna 104-4) may be obtained by feeding them through a splitter rather than directly from, for example, a driver of an NFC chip. In this implementation, the splitting and subsequent subtraction (i.e., combination of modulated and carrier signals) may be implemented through a lumped element implementation of a 180 degree hybrid.

For example, the lumped 180 degree hybrid (not shown) includes four ports. In this example, ports 2 and 3 receive the carrier signal while port 1 and 4 provides sum and difference of signals, respectively. The sum may be used during transmission while the difference signal may go to a receiver circuitry of the portable device.

Figure 4:
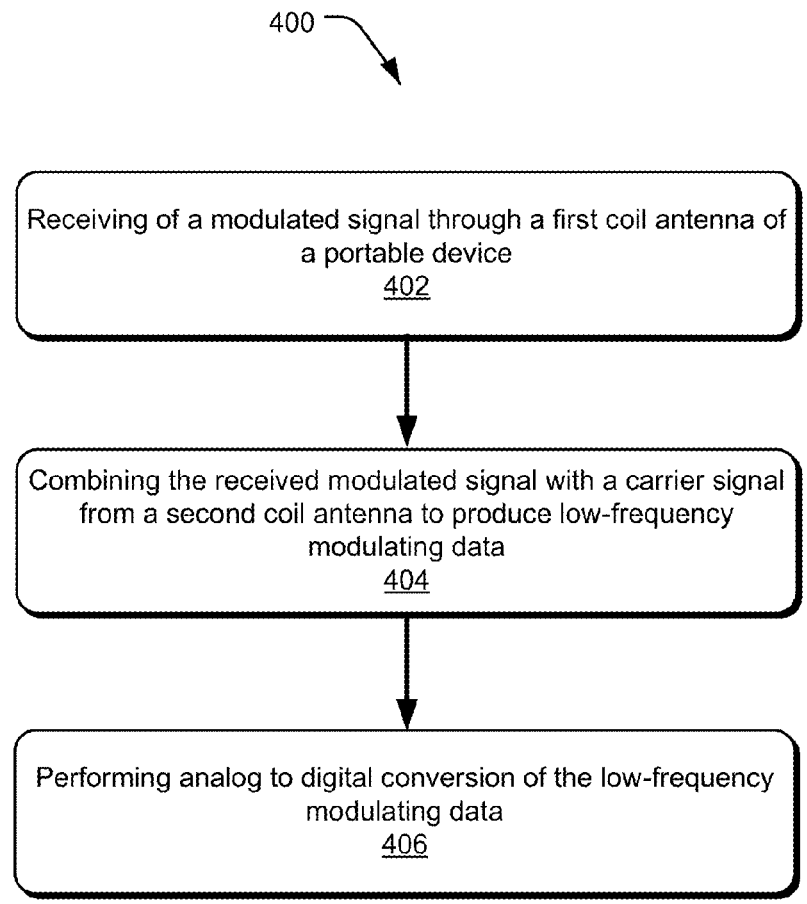
FIG. 4 is an example process chart illustrating an example method for enhancing range and increasing of data rates during near field communications (NFC) related functions or transactions.

FIG. 4 shows an example process chart 400 illustrating an example method for enhancing range and increasing of data rates during NFC related functions or transactions. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, receiving of a modulated signal through a first coil antenna of a portable device is performed. For example, the portable device 102 engages in NFC transaction with the credit card 106 by directing the credit card 106 to the direction of the coverage area of one coil antenna (e.g., first coil antenna 104-2) of the portable device 102. In this example, the first coil antenna 104-2 of the receiving portable device 102 may operate at a carrier frequency signal of 13.56 MHz, which is modulated by a low-frequency data signal from the credit card 106 during the NFC transaction.

At block 404, combining the received modulated data with a carrier signal from a second coil antenna of the portable device is performed. For example, combining the received modulated data with the carrier signal from another coil antenna (e.g., second coil antenna 104-4) may provide sum and difference signals. In this example, the difference signal may contain the data because the carrier signal is eliminated in the process.

In another example, the receiving portable device 110 may not physically include the second coil antenna 104-4; however, however, its electrical equivalence such as the lumped inductance may be used as the second coil antenna 104-4. In this other example, the combination may provide the same output of producing the data after the carrier signal is cancelled in the process.

At block 406, performing an analog to digital conversion is performed. With the obtained output data signal from the difference signal at block 404, the data signal may pass through a receiving pin of the NFC module 202 before the data signal is supplied as an input to the ADC 204. In this example, the ADC 204 may not require higher resolution such as in 12-bit ADCs. Instead, a similar 4-bit ADC 204 may provide higher data rates and longer range as well.

The following examples pertain to further embodiments:

Example 1 is a device comprising: a near field communication (NFC) module; a first coil antenna coupled to the NFC module, the first coil antenna configured to receive a modulated signal; a second coil antenna coupled to the NFC module and connected in series with the first coil antenna, the second coil antenna configured to provide a carrier signal that is combined with the received modulated signal to produce data; and an analog to digital converter (ADC) configured to receive and transform the data from an analog to a digital signal.

In example 2, the device as recited in example 1, wherein the NFC module further includes a receiving pin configured to receive the data before supplying the data to the ADC.

In example 3, the device as recited in example 1, wherein the carrier signal provided by the second coil antenna is configured to operate an operating frequency of about 13.56 MHz, which is combined with the received modulated signal to remove the carrier signal from the received modulated signal.

In example 4, the device as recited in example 1, wherein the second coil antenna is a lumped inductor.

In example 5, the device as recited in example 1, wherein the first coil antenna is disposed at front side of the device while the second coil antenna is disposed at a back side of the device.

In example 6, the device as recited in any of examples 1 to 5, wherein there is minimal flux linkage between the first coil antenna and the second coil antenna.

In example 7, the device as recited in any of examples 1 to 5, wherein the first coil antenna is configured to operate independently from the second coil antenna.

Example 8 is an apparatus comprising: a first coil antenna configured to receive a modulated signal; a lumped inductor configured to produce a carrier signal that is combined with the modulated signal to obtain data signal; and an analog to digital converter (ADC) configured to transform the data signal from an analog data signal into a digital data signal.

In example 9, the apparatus as recited in example 8, wherein there is minimal flux linkage between the first coil antenna and the lumped inductor.

In example 10, the apparatus as recited in example 8, wherein the first coil antenna comprises a continuous loop of coil antenna configured to operate at a carrier frequency of about 13.56 MHz for near field coupling (NFC) communications.

In example 11, the apparatus as recited in example 8, wherein the carrier signal provided by the lumped inductor includes an operating frequency of about 13.56 MHz, which is combined with the received modulated signal to remove the carrier signal from the received modulated signal.

In example 12, the apparatus as recited in example 8, wherein the first coil antenna is disposed at front side of a device while the lumped inductor is disposed at a back side of the device.

In example 13, the apparatus as recited in example 8 further comprising a 180 degree hybrid splitter configured to isolate the first coil antenna from the lumped inductor.

In example 14, the apparatus as recited in any of examples 8 to 13, wherein the first coil antenna is configured to operate independently from the lumped inductor.

Example 15 is a method of enhancing range and increasing of data rates during near field communications (NFC) related functions or transactions in a device, the method comprising: receiving of a modulated signal by a first coil antenna; combining the received modulated signal to a carrier signal produced by a second coil antenna, wherein the combining cancels the carrier signal of the received modulated signal to provide a data signal; and performing an analog to digital conversion of the data signal.

In example 16, the method as recited in example 15, wherein there is minimal flux linkage between the first coil antenna and the second coil antenna.

In example 17, the method as recited in example 15, wherein the carrier signal provided by the second coil antenna includes an operating frequency of about 13.56 MHz for NFC communications.

In example 18, the method as recited in example 15, wherein the second coil antenna is a lumped inductor.

In example 19, the method as recited in example 15, wherein the first coil antenna is operated independently from the second coil antenna.

In example 20, the method as recited in any of examples 15 to 19, wherein the data signal is a low-frequency data signal.

What is claimed is:

1. A device comprising:
    a near field communication (NFC) carrier frequency configured to supply an operating frequency of about 13.57 MHz;
    a first coil antenna coupled to the NFC carrier frequency and configured to operate at 13.57 MH, the operating frequency of the first coil antenna is load modulated by a coupling NFC tag;
    a lumped inductor coupled to the NFC carrier frequency and connected in series with the first coil antenna, the lumped inductor is configured to operate at an unmodulated carrier signal of 13.57 MHz, wherein a signal across the lumped inductor is combined with the signal across the first coil antenna to eliminate the 13.57 MHz carrier frequency from the load modulated signal, the elimination of the 13.57 MHz carrier frequency produces a low-frequency modulating data;
    a hybrid splitter configured to isolate the first coil antenna from the lumped inductor, wherein the hybrid splitter subtract the unmodulated carrier signal of 13.57 MHz of the lumped inductor from the load modulated signal of the first coil antenna to produce the low-frequency modulating data; and
    an analog to digital converter (ADC) configured to receive and transform the data from an analog to a digital signal.

2. The device as recited in claim 1 further comprising a NFC module configured to perform the combination of the signals on the lumped inductor and the first coil antenna to produce and supply the low-frequency modulating data to the ADC.

3. The device as recited in claim 1, wherein there is minimal flux linkage between the first coil antenna and the lumped inductor.

4. The device as recited in claim 1, wherein the ADC is a low-resolution ADC.

5. The device as recited in claim 1, wherein the lumped inductor acts as a second coil antenna.

6. The device as recited in claim 5, wherein the first coil antenna is configured to operate independently from the second coil antenna.

7. The device as recited in claim 5, wherein the first coil antenna is disposed at front side of the device while the second coil antenna is disposed at a back side of the device.

8. An apparatus comprising:
    a near field communication (NFC) carrier frequency configured to supply an operating frequency of about 13.57 MHz;
    a first coil antenna configured to operate at 13.57 MHz that is load modulated by a coupling NFC tag;
    a lumped inductor configured to operate at a plain and unmodulated carrier signal of 13.57 MHz, wherein a signal across the lumped inductor is combined with the signal across the first coil antenna to obtain a low-frequency modulating data signal;
    a hybrid splitter configured to isolate the first coil antenna from the lumped inductor, wherein the hybrid splitter subtract the unmodulated carrier signal of 13.57 MHz of the lumped inductor from the load modulated signal of the first coil antenna to produce the low-frequency modulating data; and
    an analog to digital converter (ADC) configured to transform the low-frequency modulating data signal from an analog data signal into a digital data signal.

9. The apparatus as recited in claim 8, wherein there is minimal flux linkage between the first coil antenna and the lumped inductor.

10. The apparatus as recited in claim 8, wherein the first coil antenna comprises a continuous loop of coil antenna configured to operate at the carrier frequency of about 13.56 MHz for near field coupling (NFC) communications.

11. The apparatus as recited in claim 8, wherein the first coil antenna is configured to operate independently from the lumped inductor.

12. The apparatus as recited in claim 8, wherein the ADC is a low-resolution ADC.

13. The apparatus as recited in claim 8, wherein the first coil antenna is disposed at front side of a device while the lumped inductor is disposed at a back side of the device.

14. The apparatus as recited in claim 8, wherein the hybrid splitter is a 180 degree hybrid splitter.

15. A method of enhancing range and increasing of data rates during near field communications (NFC) related functions or transactions in a device, the method comprising:
    supplying a NFC carrier frequency of about 13.57 MHz to a first coil antenna and a lumped inductor, wherein the first coil antenna is isolated from the lumped inductor through a hybrid splitter;
    receiving of a modulated signal by the first coil antenna;
    combining an unmodulated carrier signal across the lumped inductor with the modulated signal across the first coil antenna, wherein the combining comprises canceling the carrier signal of the received modulated signal to provide a low-frequency modulating data signal; and
    performing an analog to digital conversion of the low-frequency modulating data signal.

16. The method as recited in claim 15, wherein there is minimal flux linkage between the first coil antenna and the lumped inductor.

17. The method as recited in claim 15, wherein the combining is performed by an NFC module.

18. The method as recited in claim 15, wherein the lumped inductor acts as a second coil antenna.

19. The method as recited in claim 18, wherein the first coil antenna is operated independently from the second coil antenna.

20. The method as recited in claim 15, wherein the performing of analog to digital conversion utilizes a low-resolution analog-to-digital converter (ADC).

* * * * *